US010822938B2

(12) United States Patent
Zhu et al.

(10) Patent No.: US 10,822,938 B2
(45) Date of Patent: Nov. 3, 2020

(54) METHODS OF OPTIMIZING WELL SPACING FOR SHALE GAS DEVELOPMENT

(71) Applicant: UNIVERSITY OF SCIENCE AND TECHNOLOGY, BEIJING, Beijing (CN)

(72) Inventors: Weiyao Zhu, Beijing (CN); Kun Huang, Beijing (CN); Zhen Chen, Beijing (CN); Ming Yue, Beijing (CN); Zhiyong Song, Beijing (CN); Hua Li, Beijing (CN); Baichuan Wang, Beijing (CN); Debin Kong, Beijing (CN)

(73) Assignee: UNIVERSITY OF SCIENCE AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 16/833,806

(22) Filed: Mar. 30, 2020

(65) Prior Publication Data

US 2020/0224522 A1 Jul. 16, 2020

Related U.S. Application Data

(63) Continuation of application No. PCT/CN2019/122671, filed on Dec. 3, 2019.

(30) Foreign Application Priority Data

Dec. 3, 2018 (CN) .......................... 2018 1 1467177

(51) Int. Cl.
*E21B 43/30* (2006.01)
*E21B 41/00* (2006.01)
*E21B 43/16* (2006.01)

(52) U.S. Cl.
CPC ........ *E21B 43/305* (2013.01); *E21B 41/0092* (2013.01); *E21B 43/16* (2013.01)

(58) Field of Classification Search
None
See application file for complete search history.

(56) References Cited

U.S. PATENT DOCUMENTS

2009/0152005 A1   6/2009 Chapman et al.
2017/0212276 A1   7/2017 Jerbi et al.
(Continued)

FOREIGN PATENT DOCUMENTS

CN   103266874 A   8/2013
CN   104141481 A   11/2014
(Continued)

OTHER PUBLICATIONS

Ma et al. "Efficient optimization framework for integrated placement of horizontal wells and hydraulic fracture stages in unconventional gas reservoirs", Journal of Unconventional Oil and Gas Resources 9, 2015, pp. 1-17. (Year: 2015).*
(Continued)

*Primary Examiner* — Suzanne Lo
(74) *Attorney, Agent, or Firm* — IPro, PLLC

(57) ABSTRACT

A method of optimizing well spacing for shale gas development is provided. It belongs to the technical field of hydrocarbon reservoir exploration and development. The method comprises: firstly verifying block area based on the explored geological structure; analyzing the connection situation of a shale reservoir, identifying the minimum developing area units; calculating the recoverable reserves of the units, confirming the candidate units; drilling representative shale cores and analyzing related physical properties; calculating seepage field and pressure field using unified multi-field, multi-flow-regime, and multi-scale mathematical models; calculating the effective recoverable area of each well; and arranging wells based on the rule that the interference among wells is not larger than 10%. Considering the fluid-solid coupling effects, the method can define appropriately well spacing for shale gas exploration and enhance effectively the output of shale gas.

12 Claims, 5 Drawing Sheets

(56) References Cited

U.S. PATENT DOCUMENTS

| | | | |
|---|---|---|---|
| 2018/0258762 A1* | 9/2018 | Kampfer | E21B 43/26 |
| 2019/0271211 A1* | 9/2019 | Mustapha | E21B 41/00 |
| 2020/0018145 A1* | 1/2020 | Hou | E21B 49/00 |

FOREIGN PATENT DOCUMENTS

| | | |
|---|---|---|
| CN | 104948163 A | 9/2015 |
| CN | 105095986 A | 11/2015 |
| CN | 105317407 A | 2/2016 |
| CN | 105422076 A | 3/2016 |
| CN | 105735960 A | 7/2016 |
| CN | 106351651 A | 1/2017 |
| CN | 108343420 A | 7/2018 |
| CN | 109441422 A | 3/2019 |
| WO | 2017015317 A1 | 1/2017 |
| WO | 20170015317 A1 | 1/2017 |

OTHER PUBLICATIONS

Yu et al. "Optimization of Multiple Hydraulically Fractured Horizontal Wells in Unconventional Gas Reservoirs", Journal of Petroleum Engineering, vol. 2013, 16 pages. (Year: 2013).*

Sahai et al. "Optimal Well Spacing of Configurations for Unconventional Gas Reservoirs", SPE155751, 2012, 21 pages. (Year: 2012).*

Wei Y. et al, Optimization of shale gas well pattern and spacing, Natural Gas Industry, Apr. 30, 2018, 38-4, Chengdu China.

Zhu W. et al, Calculation of effective startup degree of non-Darcy flow in low or ultra-low permeability reservoirs, Acta Petrolei Sinica, May 31, 2010, 31-3, Beijing China.

* cited by examiner

METHODS OF OPTIMIZING WELL SPACING FOR SHALE GAS DEVELOPMENT

CROSS-REFERENCE TO RELATED APPLICATIONS

This application claims priority to China Patent Application Serial NO. 201811467177.7 entitled Methods of Optimizing Well Spacing for Shale Gas Development, filed on Dec. 3, 2018, which is hereby incorporated by reference in its entirety.

TECHNICAL FIELD

The present disclosure relates to the technical field of hydrocarbon reservoir exploration and development, especially to methods of optimizing well spacing for shale gas development.

BACKGROUND

Shale gas reservoirs are a type of reservoirs with ultralow porosity and low permeability. Generally speaking, the porosity is not larger than 10%, and the gas-bearing effective porosity is usually only 1% to 5%. Shale has complex bedding structure and distributed micro-fractures, which are usually less than 0.1 mD. The pore throat radius of shale reservoirs is at the scale of nano/micrometer. The flow characteristics of gas therein are different from normal reservoirs. It is necessary to analyze their seepage features at micro-scale as well as the desorption, diffusion, and slip flow problems in shale gas flow. The seepage equations at present cannot completely reflect these relating problems.

Secondly, fracturing, especially staged volume fracturing, is an effective method to realize the effective recovery of shale reservoirs. A fracture network of intercrossed natural fractures and manmade fractures is formed in volume fracturing, increasing remolded volume, enhancing initial output and final recovery. However, the complex seepage field caused by volume fracturing, at the meantime, brings enormous difficulties to the description of mathematical models. Different from the radial flow of regular oil and gas, the structure of the fracture network would influence the pressure distribution of seepage region. Because the distribution of fractures in the zones adjacent to wells makes the reservoirs heterogeneous, the recoverable area is no longer round, but elliptic, of which the major axis is the direction of the fracture network distribution.

Besides, after fracturing, the flow of shale gas is affected obviously by fluid-solid coupling effects. Under the effects of pressure, the structure of shale reservoirs is destroyed, and the paths of seepage become deformed, causing the change of the porosity and permeability of shale reservoirs. At present, the study considering the fluid-solid coupling effects, however, is scarce. There has been no effective method of calculating horizontal well spacing after the fracturing of shale gas with the consideration of the fluid-solid coupling.

SUMMARY

In order to solve at least one of the technical problems above, this disclosure provides a method of optimizing well spacing for shale gas development, comprising: identifying the geological structure of a shale reservoir, verifying block area based on the explored geological structure; analyzing connection situation of the shale reservoir, selecting the blocks with good connectivity as the minimum developing area units; calculating the recoverable reserves of the minimum developing area units, selecting those within an economic criterion as alternative options, or abandoning the minimum developing area units beyond the economic criterion; drilling representative shale cores in the minimum developing area units, identifying related parameters via experiments; establishing mathematical models for calculating seepage field and pressure field; calculating effective recoverable boundary based on the seepage field and pressure field, calculating effective recoverable area based on the effective recoverable boundary, and arranging wells according to the effective recoverable area of each well.

According to at least an embodiment of this disclosure, the shale reservoir means a reservoir that mainly contain abundant hydrocarbon shale, and the shale gas is unconventional gas existing in the shale reservoir.

According to at least an embodiment of this disclosure, a method of verifying the block area comprises: drawing the outline of the blocks proportionally on grid paper, of which the grids are squares, verifying the number of the grids, which is multiplied by the area of a single grid, and obtaining the block area.

According to at least an embodiment of this disclosure, the recoverable reserve V is $$V = Ah\phi(1-S_{wc})$$

where A is the area of a recoverable block, h is reservoir thickness, $\phi$ is stress-affected rock porosity, expressing the percentage of pores in the apparent volume of rock, and $S_{wc}$ is the saturation of bound water.

According to at least an embodiment of this disclosure, the economic criterion is $$\frac{\left(\begin{array}{c}\text{Economic value of recoverable reserve} - \\ \text{Developing cost}\end{array}\right)}{\text{Developing cost}} \times 100\% \geq 10\%.$$

According to at least an embodiment of this disclosure, the related parameters include permeability, rock porosity, shale desorption curves, gas viscosity, gas density, and pore compressibility.

According to at least an embodiment of this disclosure, the mathematical models compromise: stress-affected rock porosity $$\phi = \phi_0 e^{-\alpha C_\phi \sigma}$$

where $\phi_0$ is rock porosity without being affected by stress; $C_\phi$ is pore compressibility, expressing the variation in porosity with a unit decrease in formation pressure; $\sigma$ is effective stress, atm; $\alpha$ is correction coefficient, $\alpha > 0$.

The expression of stress-sensitive permeability is $$K = K_0 e^{-\beta C_\phi \sigma}$$

where K is stress-affected permeability of porous media, $\mu m^2$; $K_0$ is permeability without being affected by stress, $\mu m^2$; $\beta$ is correction coefficient, $\beta > 0$.

Thus, the stress-affected seepage velocity of shale gas $v$ is $$v = -\frac{K_0 e^{-\beta C_\phi \sigma}}{\mu}\left(1 + \frac{3\pi a \phi_0 e^{(\beta-\alpha)C_\phi \sigma}}{16 K_0}\frac{\mu D_K}{p}\right)\left(\frac{dp}{dr}\right)$$

where α is sparse factor, $$a = \frac{128}{15\pi^2}\tan^{-1}(4K_n^{0.4});$$

$D_K$ is Knudsen diffusion coefficient, $$D_K = \frac{4\bar{r}}{3}\sqrt{\frac{2ZRT}{\pi M}};$$

$K_n$ is Knudsen Number; μ is gas viscosity, mPa·s; p is formation pressure, atm; $\bar{r}$ is flowing pore radius, m; Z is gas deviation factor; R is universal gas constant, J·mol⁻¹K⁻¹; T is temperature, K; M is gas molecular mass; r is the distance of any spot in the reservoir away from a well, m.

According to at least an embodiment of this disclosure, the mathematical models further compromise formation pressure distribution $$\left(p + \frac{3\pi a\phi_0 e^{(\beta-\alpha)C_\phi\sigma}\mu D_K}{16K_0}\right)^2 = \left(p_e + \frac{3\pi a\phi_0 e^{(\beta-\alpha)C_\phi\sigma}\mu D_K}{16K_0}\right)^2 - \frac{\left(p_e + \frac{3\pi a\phi_0 e^{(\beta-\alpha)C_\phi\sigma}\mu D_K}{16K_0}\right)^2 - \left(p_w + \frac{3\pi a\phi_0 e^{(\beta-\alpha)C_\phi\sigma}\mu D_K}{16K_0}\right)^2}{\ln\frac{R(t)}{r_w}}\ln\frac{R(t)}{r}$$

where the subscript e means original condition, w means wells; $p_e$ is the pressure at the supply boundary, atm; $p_w$ is the pressure at the bottom of a well, atm; R(t) is the propagation distance of pressure at time t, m; $r_w$ is the radius of a gas well, m.

According to at least an embodiment of this disclosure, the effective recoverable boundary is $$R(t) = \sqrt{\frac{t}{\frac{\phi_0 e^{(\beta-\alpha)C_\phi\sigma}\mu c}{2K_0} + \pi h\frac{q_d t}{q}}}$$

where t is production time, d; c is gas compressibility factor, atm⁻¹; $q_d$ is desorption of per unit volume of shale within per unit time, kg·m⁻³·d⁻¹; q is flow rate, kg/d.

According to at least an embodiment of this disclosure, free gas from the original condition till the present condition is $$Q_f = \int_{r_w}^{R(t)} 2\pi rh[(\phi\rho)_e - (\phi\rho)]dr$$

where ρ is gas density, kg/m³.

Desorption gas $Q_d$ is:

$$Q_d = \int_{r_w}^{R(t)} 2\pi rhq_d dr$$

Gas recovered from formation $Q_1$ is $$Q_1 = Q_f + Q_d = \int_{r_w}^{R(t)} 2\pi rh\{[(\phi\rho)_e - (\phi\rho)] + q_d t\}dr$$

Gas recovered from wells $Q_2$ is $$Q_2 = \pi r_w^2 h[(\phi\rho)_e - (\phi\rho)_w]$$

Total gas output Q is $$Q = Q_1 + Q_2 = $$

$$\pi h\frac{\phi_0 e^{-\alpha C_\phi\sigma}cT_{sc}Z_{sc}\rho_{gsc}}{p_{sc}TZ}\left[\left(p_e + \frac{3\pi a\phi_0 e^{(\beta-\alpha)C_\phi\sigma}\mu D_K}{16K_0}\right)^2 - \left(p_w + \frac{3\pi a\phi_0 e^{(\beta-\alpha)C_\phi\sigma}\mu D_K}{16K_0}\right)^2\right]\frac{R^2(t) - r_w^2}{2\ln\frac{R(t)}{r_w}} + $$

$$\pi hq_d t[R^2(t) - r_w^2]$$

where the subscript sc means physical properties under standard state conditions, $p_{sc}$ is the pressure under standard state conditions (273.15K), atm; $Z_{sc}$ is the gas deviation factor under standard state conditions; $T_{sc}$ is the temperature under standard state conditions, K; $\rho_{gsc}$ is the gas density under standard state conditions, kg/m³.

Flow rate at the producing well q is $$q = \frac{\pi K_0 e^{-\beta C_\phi\sigma}hZ_{sc}T_{sc}\rho_{gsc}}{p_{sc}T\mu Z\ln\frac{R(t)}{r_w}}\left[\left(p_e + \frac{3\pi a\phi_0 e^{(\beta-\alpha)C_\phi\sigma}\mu D_K}{16K_0}\right)^2 - \left(p_w + \frac{3\pi a\phi_0 e^{(\beta-\alpha)C_\phi\sigma}\mu D_K}{16K_0}\right)^2\right]$$

The expression of total gas output based on steady seepage is Q=qt. Omitting the effects of $r_w$, the effective recoverable boundary is $$R(t) = \sqrt{\frac{t}{\frac{\phi_0 e^{(\beta-\alpha)C_\phi\sigma}\mu c}{2K_0} + \pi h\frac{q_d t}{q}}}$$

According to at least an embodiment of this disclosure, a horizontal well of shale gas forms a vertical fracture surface with a reservoir thickness of h and an opening of $2x_f$ at surrounding formation. The shape of the seepage region around the fracture is approximate to an ellipse. Thus, the equation for calculating the recoverable boundary is $$R_{me}(t) = \sqrt{\frac{t}{\frac{\phi_0 e^{(\beta-\alpha)C_\phi\sigma}\mu c}{2K_0} + \pi h\frac{q_d t}{q}}}$$

$$R_{fe}(t) = \sqrt{x_f^2 + \frac{t}{\frac{\phi_0 e^{(\beta-\alpha)C_\phi\sigma}\mu c}{2K_0} + \pi h\frac{q_d t}{q}}}$$

where $x_f$ is the half-length of a fracture, m; $R_{me}(t)$ is the length of the minor axis of an ellipse, m; $R_{fe}(t)$ is the length of the major axis of an ellipse, m.

The area of effective recovery is: $S = \pi R_{me}(t)R_{fe}(t)$, where S is the area of an ellipse, m².

According to at least an embodiment of this disclosure, during arranging the wells, the interference ratio among wells I that means the percentage of the area of the overlap between two ellipses in that of either ellipse is calculated. When the calculated interference ratios between two wells I both are no more than 10%, the well arrangement succeeds.

According to at least an embodiment of this disclosure, when the interference ratio among wells I is calculated, the ellipses are divided into small grids of equal area, and the number of grids within the overlap is calculated, which is further divided by the total number of grids within a single ellipse. The specific equation is $$I = \frac{S_c}{S} \times 100\% = \frac{n_c}{n} \times 100\%$$

wherein $S_c$ is the area of overlap, m²; $n_c$ is the number of grids within the overlap among different ellipses; n is the number of grids within a single ellipse.

The beneficial effects of this disclosure are as follows: the method can identify the well spacing of shale gas properly and enhance the output of shale gas effectively.

DETAILED DESCRIPTION

Figure 1:
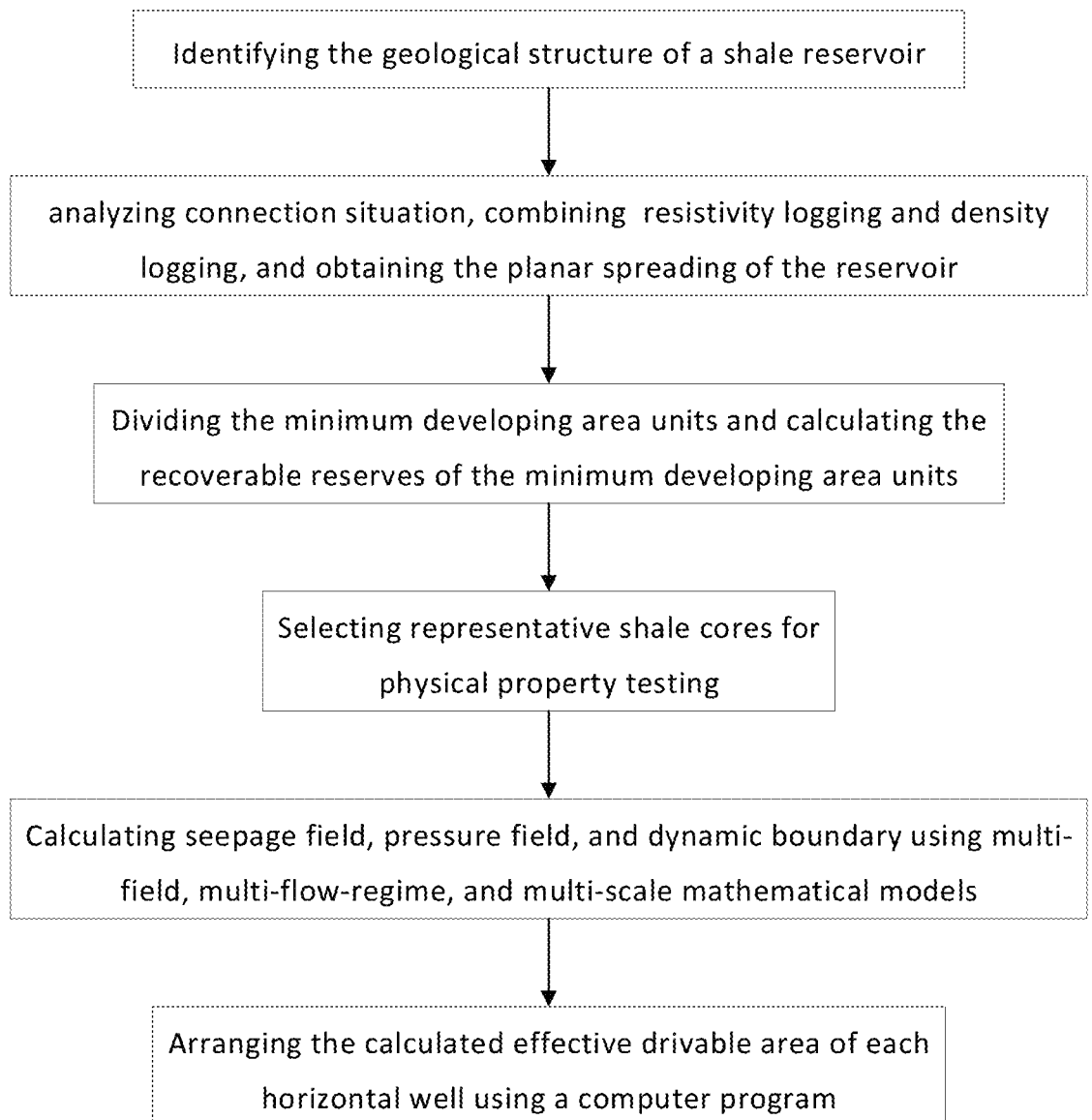
FIG. 1 is the flowchart of the method of optimizing well spacing for shale gas development according to at least an embodiment of this disclosure.

Next, this disclosure is furthered illustrated with combining drawings and embodiments. It is to be understood that the embodiments described herein are to be considered in all respects only as illustrative and not restrictive. In addition, it should be pointed out that only the parts related to this disclosure are shown in the drawings for convenience.

It should be noted that the embodiments and their characteristics of this disclosure may be re-combined if not conflicted. This disclosure will be specifically illustrated with referring to the drawings and embodiments.

Part of the symbols used in this disclosure is as follows:

a is sparse factor, dimensionless physical quantity;

A is recoverable block area, m²;

c is gas compressibility factor, atm⁻¹;

$C_\phi$ is pore compressibility factor, dimensionless physical quantity;

$D_K$ is Knudsen diffusion coefficient, dimensionless physical quantity;

h is reservoir thickness, m;

I is interference ratio among wells, dimensionless physical quantity;

K is stress-affected permeability, μm²;

$K_0$ is permeability without being affected by stress, μm²;

$K_n$ is Knudsen Number, dimensionless physical quantity;

M is gas molecular mass;

n is the number of grids within a single ellipse;

$n_c$ is the number of grids within the overlap of different ellipses;

p is formation pressure, atm;

$p_e$ is the pressure at the supply boundary, atm;

$p_w$ is the pressure at the bottom of a well, atm;

$p_{sc}$ is the pressure under standard state conditions (273.15K);

q is flow rate, kg/d;

$q_d$ is desorption of per unit volume of shale within per unit time, kg·m⁻³·d⁻¹;

Q is total gas output, kg;

$Q_1$ is gas recovered from formation, kg;

$Q_2$ is gas recovered from wells, kg;

$Q_f$ is free gas, kg;

$Q_d$ is desorption gas, kg;

r is the distance of any spot in the reservoir away from a well, m;

$r_e$ is the radius of supply boundary, m;

$r_w$ is the radius of a gas well, m;

$\bar{r}$ is flowing pore radius, m;

R is universal gas constant, J·mol⁻¹·K⁻¹;

R(t) is the propagation distance of pressure at time t, m;

$R_{me}(t)$ is the length of the minor axis of an ellipse, m;

$R_{fe}(t)$ is the length of the major axis of an ellipse, m;

S is the area of an ellipse, m²;

$S_c$ is the area of overlap, m²;

$S_{wc}$ is the saturation of bound water, dimensionless physical quantity;

t is production time, day;

T is temperature, K;

$T_{sc}$ is the temperature under standard state conditions, K;

$x_f$ is the half-length of a fracture, m;

Z is gas deviation factor, dimensionless physical quantity;

$Z_{sc}$ is gas deviation factor under standard state conditions, dimensionless physical quantity;

α is correction coefficient, dimensionless physical quantity, α>0;

β is correction coefficient, dimensionless physical quantity;

v is the seepage velocity of shale gas, m/s;

μ is gas viscosity, mPa·s;

σ is effective stress, atm;

φ is stress-affected rock porosity, expressing the percentage of pores in the apparent volume of rock, dimensionless physical quantity;

$\phi_0$ is rock porosity without being affected by stress, dimensionless physical quantity;

ρ is gas density, kg/m³;

$\rho_{gsc}$ is the gas density under standard state conditions, kg/m³.

This disclosure provides a method of optimizing well spacing for shale gas development.

As shown in FIG. 1, the method includes following steps:

(1) identifying the geological structure of a shale reservoir and verifying block area based on the explored geological structure;

(2) analyzing connection situation of the shale reservoir and identifying the minimum developing area units;

(3) calculating the recoverable reserves of the area units identified in Step (2), selecting those within an economic criterion as alternative options, or abandoning those beyond the economic criterion;

(4) drilling representative shale cores in the minimum developing area units and identifying related parameters via experiments;

(5) establishing unified mathematical models for calculating seepage field and pressure field;

(6) deriving the method for calculating effective recoverable boundary based on the seepage field and pressure field, calculating the effective recoverable boundary and then effective recoverable area based on the effective recoverable boundary, and arranging wells according to the effective recoverable area of each well.

The types of shale reservoirs include reservoirs that contain shale gas, and shale gas is unconventional gas existing in shale reservoirs. Identifying the block boundary comprises following steps: via the collecting, handling, and interpreting earthquake materials, combining comprehensive geological researches with the analysis of well logging materials, verifying the structure background of rock units, studying the structure characteristics of basins and development characteristics of formation, analyzing the deposition environment of basins, marking shale (mud) layers and verifying their distribution, predicting the propagation situation of fractures and the characteristics of accumulation, proposing drilling targets for shale gas exploring.

The specific measurements for analyzing the reservoir connection situation include: within the block boundary verified, based on the discovered reservoir characteristics of the shale gas, the distribution features of faults, pinchout features, reservoir thickness, structure background, the layer sequence of formation, and the maturity of hydrocarbon in shale, analyzing the connection situation of the shale reservoir in the blocks by the comparison of layers, classifying the reservoir further at a smaller scale based on the reservoir connection situation, and selectively eliminating the regions with poor reservoir connection situation.

The specific steps of the calculation of recoverable reserves include estimating the recoverable reserves of the selected region using the measured physical properties of the reservoir by applying methods of reservoir engineering and selectively eliminating the blocks with low recoverable reserves.

The calculation equation of recoverable reserve V is $$V = A h \phi (1 - S_{wc}) \quad (1)$$

The criterion of economic benefit is $$\left( \frac{\text{Economic value of recoverable reserve} - \text{Developing cost}}{\text{Developing cost}} \right) \times 100\% \geq 10\% \quad (2)$$

Within the economic criterion, i.e. the economic benefit $\geq 10\%$, the blocks are selected as alternative options; Beyond the economic criterion, i.e. the economic benefit $<10\%$, the blocks are abandoned.

The specific steps of obtaining representative cores and physical property analysis include: acquiring cores at the verified target layers during drilling process. Via experiments inhouse, various important physical properties are obtained, which include permeability, porosity, hydrocarbon content, gas abundance, the absorption features of shale gas, pore compressibility of shale. The flow characteristics of gas in fractures should be further analyzed via experiments for the cores with fractures.

Figure 2:
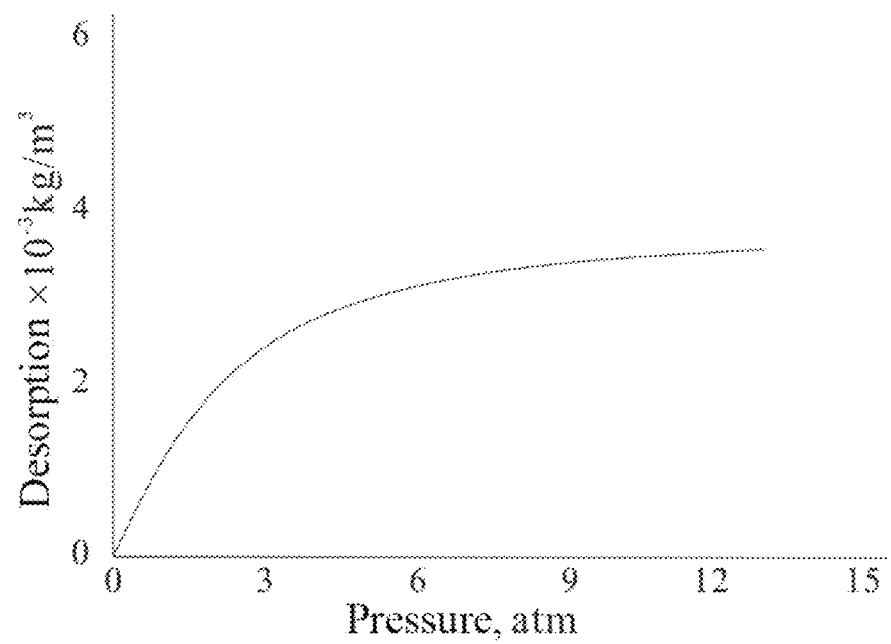
FIG. 2 is a desorption curve of shale gas according to at least an embodiment of this disclosure.

Calculating seepage field and pressure field using multi-field, multi-flow-regime, and multi-scale unified mathematical models include steps: applying the established mathematical models and substituting the measured experimental data, including permeability, rock porosity, shale desorption curve (FIG. 2), and gas viscosity. According to the characteristic parameters of each well, horizontal wells are described with a tri-region model to calculate the seepage field and pressure field. The characteristic parameters of horizontal wells include the length of horizontal wells, the fracturing level of horizontal segments, and the length of horizontal fractures.

The calculation method of the effective control area of a single well mainly includes: plot the control area of multi-fracturing horizontal wells using the calculated distribution of seepage field and pressure field.

The specific method of well arrangements considering interference ratio is, based on the calculated control area of horizontal wells, calculating the number of wells arranged with computer programs according to total developing area, ensuring the area of overlap between two wells is less than 10% during calculation. If not, repeat above steps until the arranged horizontal wells meets all requirements.

Next, it will be illustrated with specific embodiments.

During the application of the method, it proceeds per the following steps.

Step 1: the geological structure of a shale reservoir is identified, and the geological structure of the region studying is obtained via geological exploratory wells and combined well logging. The identification and recording are conducted according to such main characteristics as geological features of reservoirs and deposition patterns, deposition morphology, and geological cycle thereof.

The types of shale reservoirs include reservoirs that contain shale gas. Identifying the block boundary consists of following steps: via collecting, handling, and interpreting earthquake materials, combining comprehensive geological researches with the analysis of well logging materials, verifying the structure background of rock units, studying the structure characteristics and development characteristics of formation, analyzing the deposition environment, marking shale (mud) layers and verifying their distribution, predicting the propagation situation of fractures and the characteristics of accumulation, proposing drilling targets for shale gas exploring.

Step 2: layer connection situation is analyzed, and the planar spreading of the reservoir, reservoir thickness, and the position of reservoir pinchout boundary are obtained via verifying the shale reservoir by combining resistivity logging and density logging with neutron logging. The selected blocks can be further divided by considering fractures and pinchout boundary as natural division lines.

The specific measurements for identifying the reservoir connection situation include, within the block boundary verified, based on the discoveredshale gas reservoir characteristics, the distribution features of faults, pinchout features, reservoir thickness, structure background, the layer sequence of formation, and the maturity of hydrocarbon in shale, analyzing the connection situation of the shale reservoir in the blocks by the comparison of layers, classifying the reservoir further at a smaller scale based on the reservoir connection situation, and selectively eliminating the regions with poor reservoir connection situation.

Step 3: the recoverable reserves in the minimum developing area units are calculated, and the evaluation of economic benefit is carried out. Those within the economic criterion are selected as alternative options, and those beyond the economic criterion are abandoned.

Specifically, based on the measured reservoir connection features, the recoverable reserves of the minimum developing area units are calculated by applying methods of reservoir engineering. According to the exploring techniques at present, the cost of exploring the blocks is estimated under the current exploring cost frame. The cost is compared with the potential economic benefit. When the economic benefit is less than the limited exploring economic benefit, the blocks are eliminated. The blocks with economic exploring value are considered as alternative blocks.

Step 4: representative shale cores are obtained at target layers during drilling in the minimum developing area units. Having been obtained, the cores are cleaned and cut, and the measurements of physical properties are further conducted in laboratory. Via experiments inhouse, various important physical properties are obtained, which include permeability, porosity, hydrocarbon content, gas abundance, and the absorption content of shale gas. The flow characteristics of gas in fractures should be further analyzed via experiments inhouse for the cores with fractures. Related physical properties are analyzed, and related parameters are identified with experiments.

Specifically, combining logging techniques, the rock porosity is verified using well nuclear magnetic resonance logging. Rock mechanics parameters are identified using sonic logging. Fractures are detected using imaging logging. The absorption characteristics of the block cores are quantitatively described using such experimental apparatus as shale gas absorption instrument, i.e. shale absorption and desorption curves are obtained.

Step 5: seepage field and pressure field are calculated using multi-field, multi-flow-regime, and multi-scale mathematical models. Accurate seepage field and pressure field can make the calculation of recoverable boundary and area approach more closely to the reality, resulting in more appropriate production arrangement. The said mathematical models mainly include:

The stress sensitivity of shale gas mainly includes porosity sensitivity and permeability sensitivity. Thereinto, the porosity sensitivity is $$\phi = \phi_0 e^{-\alpha C_\phi \sigma} \quad (3)$$

Figure 3:
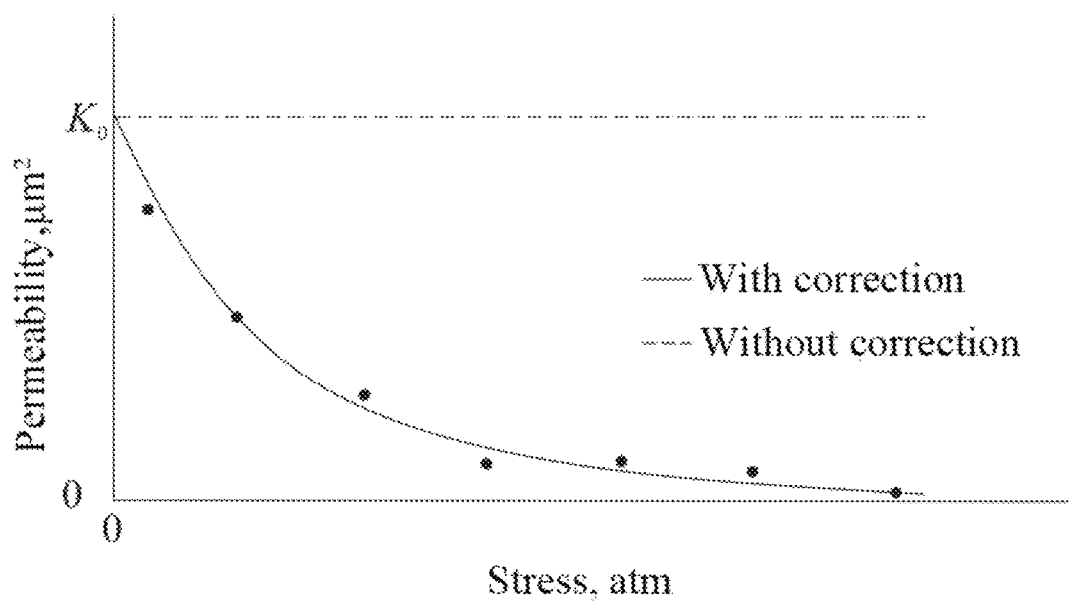
FIG. 3 is a curve of permeability varying with stress according to at least an embodiment of this disclosure.

Under the effects of stress, the variation in porosity induces that of permeability. The expression of stress-sensitive permeability is $$K = K_0 e^{-\beta C_\phi \sigma} \quad (4)$$

where the most crucial matter is the value of $C_\phi$, which is obtained via experiments and is in the order of $10^{-3}$, and $\sigma$ is related to pressure and is obtained via experiments. As shown in FIG. 3, the real permeability changes with stress rather than constant. The coefficient $\beta$ can be obtained by fitting equation (4) to the experimental data. Obviously, the permeability corrected by equation (4) can reflect real system features more accurately.

When the effects of stress are not considered, seepage velocity $v$ is $$v = -\frac{K_0}{\mu}\left(1 + \frac{3\pi a}{16 K_0} \frac{\mu D_K}{p}\right)\left(\frac{dp}{dr}\right) \quad (5)$$

Thus, stress-affected seepage velocity $v$ is $$v = -\frac{K_0 e^{-\beta C_\phi \sigma}}{\mu}\left(1 + \frac{3\pi a \phi_0 e^{(\beta-\alpha) C_\phi \sigma}}{16 K_0} \frac{\mu D_K}{p}\right)\left(\frac{dp}{dr}\right) \quad (6)$$

where $$a = \frac{128}{15\pi^2} \tan^{-1}(4 K_n^{0.4}), \quad D_K = \frac{4r}{3}\sqrt{\frac{2ZRT}{\pi M}}.$$

$K_n$ is Knudsen Number and used for determining the flow regime of gas flow. When $K_n < 0.001$, the gas flow is continuous flow; when $0.001 < K_n < 0.1$, it is slip flow; when $0.1 < K_n < 10$, it is transition flow; when $K_n > 10$, it is free molecular flow.

When the effects of stress are not taken into account, formation pressure distribution is $$\left(p + \frac{3\pi a \mu D_K}{16 K_0}\right)^2 = \quad (7)$$

$$\left(p_e + \frac{3\pi a \mu D_K}{16 K_0}\right)^2 - \frac{\left(p_e + \frac{3\pi a \mu D_K}{16 K_0}\right)^2 - \left(p_w + \frac{3\pi a \mu D_K}{16 K_0}\right)^2}{\ln \frac{R(t)}{r_w}} \ln \frac{R(t)}{r}$$

Considering the effects of stress, the formation pressure distribution is $$\left(p + \frac{3\pi a \phi_0 e^{(\beta-\alpha) C_\phi \sigma} \mu D_K}{16 K_0}\right)^2 = \left(p_e + \frac{3\pi a \phi_0 e^{(\beta-\alpha) C_\phi \sigma} \mu D_K}{16 K_0}\right)^2 - \quad (8)$$

$$\frac{\left(p_e + \frac{3\pi a \phi_0 e^{(\beta-\alpha) C_\phi \sigma} \mu D_K}{16 K_0}\right)^2 - \left(p_w + \frac{3\pi a \phi_0 e^{(\beta-\alpha) C_\phi \sigma} \mu D_K}{16 K_0}\right)^2}{\ln \frac{R(t)}{r_w}} \ln \frac{R(t)}{r}$$

The gas recovery of shale gas is thus obtained, i.e. the total gas output is the sum of gas recovered from formation and wells. Thereinto, the gas recovered from formation is the sum of free gas and desorption gas.

Since the change of reservoir pressure would cause the change of gas density during exploration, the free gas from the original condition till the present condition is $$Q_f = \int_{r_w}^{R(t)} 2\pi r h [(\phi \rho)_e - (\phi \rho)] dr \quad (9)$$

The subscript e in equation (9) means the original condition.

Desorption gas is $$Q_d = \int_{r_w}^{R(t)} 2\pi r h q_d t \, dr \quad (10)$$

The expression of the gas recovered from formation $Q_1$ can be further obtained $$Q_1 = Q_f + Q_d = \int_{r_w}^{R(t)} 2\pi r d\{[(\phi \rho)_e - (\phi \rho)] + q_d t\} dr \quad (11)$$

Considering gas equation of state $$\rho = \frac{T_{sc} Z_{sc} \rho_{gsc}}{p_{sc}} \cdot \frac{p}{TZ} \approx \frac{T_{sc} Z_{sc} \rho_{gsc}}{p_{sc} TZ} c\left(p + \frac{3\pi a \phi_0 e^{(\beta-\alpha) C_\phi \sigma} \mu D_K}{16 K_0}\right)^2 \quad (12)$$

From equation (12), it is obtained $$\frac{(\phi\rho)_e - (\phi\rho)}{(\phi\rho)_e - (\phi\rho)_w} = \frac{\left(p + \frac{3\pi a \phi_0 e^{(\beta-\alpha)C_\phi\sigma}\mu D_K}{16K_0}\right)^2 - \left(p_e + \frac{3\pi a \phi_0 e^{(\beta-\alpha)C_\phi\sigma}\mu D_K}{16K_0}\right)^2}{\left(p_e + \frac{3\pi a \phi_0 e^{(\beta-\alpha)C_\phi\sigma}\mu D_K}{16K_0}\right)^2 - \left(p_w + \frac{3\pi a \phi_0 e^{(\beta-\alpha)C_\phi\sigma}\mu D_K}{16K_0}\right)^2} \quad (13)$$

The subscript w in equation (13) means wells. Combining equation (8) and (13), it is obtained $$(\phi\rho)_e - (\phi\rho) = \frac{(\phi\rho)_e - (\phi\rho)_w}{\ln\frac{R(t)}{r_w}} \ln \frac{R(t)}{r} \quad (14)$$

With equation (11) and (14), the gas recovered from formation $Q_1$ is further obtained $$Q_1 = \pi h[(\phi\rho)_e - (\phi\rho)_w]\left[\frac{R^2(t) - r_w^2}{2\ln\frac{R(t)}{r_w}} - r_w^2\right] + \pi h q_d t[R^2(t) - r_w^2] \quad (15)$$

The gas recovered from wells $Q_2$ is $$Q_2 = \pi r_w^2 h[(\phi\rho)_e - (\phi\rho)_w] \quad (16)$$

Since the total gas output is equal to the sum of the gas recovered from formation $Q_1$ and wells, considering equation (12), the total gas output Q is $$Q = Q_1 + Q_2 \quad (17)$$

$$= \pi h \frac{\phi_0 e^{-\alpha C_\phi\sigma} c T_{sc} Z_{sc} \rho_{gsc}}{p_{sc} T Z}\left[\left(P_e + \frac{3\pi a \phi_0 e^{(\beta-\alpha)C_\phi\sigma}\mu D_K}{16K_0}\right)^2 - \left(p_w + \frac{3\pi a \phi_0 e^{(\beta-\alpha)C_\phi\sigma}\mu D_K}{16K_0}\right)^2\right]\frac{R^2(t) - r_w^2}{2\ln\frac{R(t)}{r_w}} +$$

$$\pi h q_d t [R^2(t) - r_w^2]$$

In addition, based on steady seepage, flow rate can be written as $$q = \frac{\pi K_0 e^{-\beta C_\phi\sigma} h Z_{sc} T_{sc} \rho_{gsc}}{p_{sc} T \mu Z \ln \frac{R(t)}{r_w}} \quad (18)$$

$$\left[\left(p_e + \frac{3\pi a \phi_0 e^{(\beta-\alpha)C_\phi\sigma}\mu D_K}{16K_0}\right)^2 - \left(p_w + \frac{3\pi a \phi_0 e^{(\beta-\alpha)C_\phi\sigma}\mu D_K}{16K_0}\right)^2\right]$$

Combining equation (17) and (18), it is obtained $$Q = \frac{\phi_0 e^{(\beta-\alpha)C_\phi\sigma}\mu c q}{2K_0}[R^2(t) - r_w^2] + \pi h q_d t[R^2(t) - r_w^2] \quad (19)$$

Furthermore, Q=qt. As $r_w \ll R(t)$ and the effects of $r_w$ is omitted, it is obtained $$t \approx \left(\frac{\phi_0 e^{(\beta-\alpha)C_\phi\sigma}\mu c}{2K_0} + \pi h \frac{q_d t}{q}\right)^2 R^2(t) \quad (20)$$

Therefore, $$R(t) = \sqrt{\frac{t}{\frac{\phi_0 e^{(\beta-\alpha)C_\phi\sigma}\mu c}{2K_0} + \pi h \frac{q_d t}{q}}} \quad (21)$$

Well arrangement is carried out according to the calculated effective recoverable area of each well.

The seepage of low-permeability reservoirs has non-linear characteristics and threshold pressure gradient. The spreading of pressure disturbance propagates outwards gradually over time rather than propagate instantaneously to infinity. The law of seepage thereof is a problem of moving boundary. The recoverable boundary is the outer boundary of the effects of the propagation of pressure disturbance.

The calculation of the effective recoverable area includes the calculation of the recoverable boundary and area.

Figure 4:
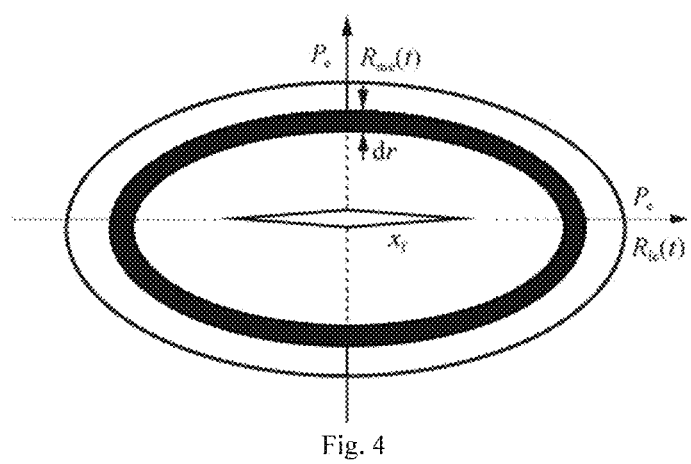
FIG. 4 is a sketch of a well with a single fracture according to at least an embodiment of this disclosure.

Referring to FIG. 4, after the fracturing of a shale gas well, the fracture run through the whole thickness of the reservoir, forming a vertical fracture surface with a reservoir thickness of h and an opening of $2x_f$ at surrounding formation. The shape of the seepage region around the fracture is approximate to an ellipse. The direction of the fracture is the direction of the main streamline and the half-length of the fracture is the focal length of the ellipse. The length of the minor axis of the ellipse is equal to the radius that can be driven by the un-fractured substrate of the shale reservoir, expressed as $R_{me}(t)$. The major axis of the ellipse is the extended moving boundary of a single fracture, expressed as $R_{fe}(t)$.

For a single fracture of shale fracturing, it is satisfied $$R_{fe}^2(t) = x_f^2 + R_{me}^2(t) \quad (22)$$

When the dynamic pressure problem of unsteady seepage is being solved, every instant state of the unsteady seepage process can be treated as steady. This method is called Steady State Sequential Replacement Method, which can obtain the moving boundary of the pressure propagation. From equation (21), $$R_{me}(t) = \sqrt{\frac{t}{\frac{\phi_0 e^{(\beta-\alpha)C_\phi\sigma}\mu c}{2K_0} + \pi h \frac{q_d t}{q}}} \quad (23)$$

$$R_{fe}(t) = \sqrt{x_f^2 + \frac{t}{\frac{\phi_0 e^{(\beta-\alpha)C_\phi\sigma}\mu c}{2K_0} + \pi h \frac{q_d t}{q}}} \quad (24)$$

With the calculation equation of the area of an ellipse, the effective recoverable area is obtained $$S=\pi R_{me}(t) R_{fe}(t) \quad (25)$$

Step 6: interference ratio among wells is calculated during well arrangement. The interference ratio is defined as the percentage of the area of the overlap between two wells in that of the related ellipses.

$$I = \frac{S_c}{S} \times 100\% \quad (26)$$

If the interference ration is larger than 10%, the direction of the horizontal wells will be adjusted according to the real situation, and the well arrangement will stop until the interference among all horizontal wells is within 10%.

Figure 5:
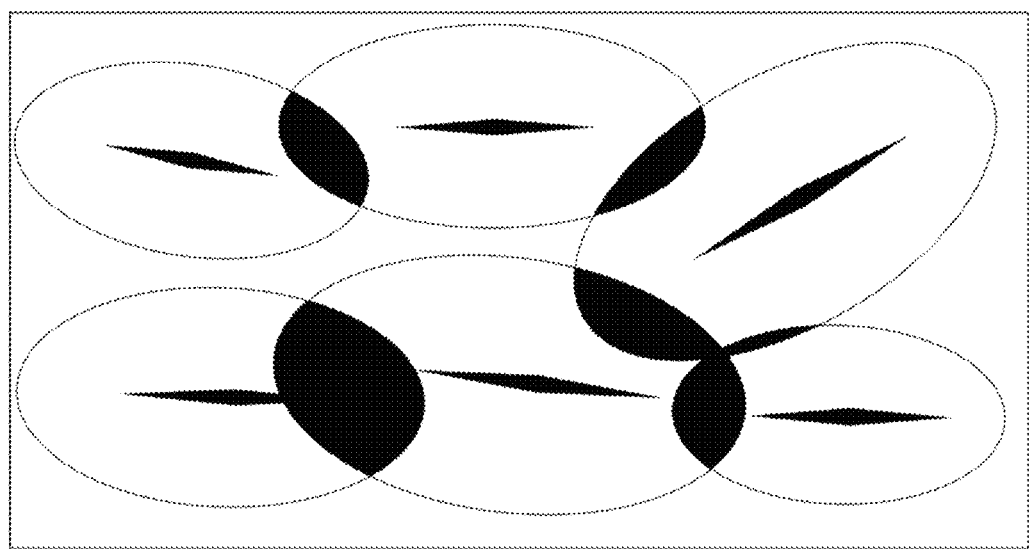
FIG. 5 is an example of arranging wells with the interference ratio >10% prior to optimization according to at least an embodiment of this disclosure.

Specifically, the calculated effective recoverable range of each horizontal well is distributed and arranged appropriately within the selected blocks using computer programs. The programs can calculate the interferential range of the recoverable range of horizontal wells with different arrangement. During calculation, as shown in FIG. 5, firstly, the shape is divided into grids of equal area using a computer. Within the allowed scale of precision, using a computer, the number of overlapped grids is calculated, which is then divided by the total number of grids within the related single ellipse. The specific calculation equation is $$I = \frac{S_c}{S} \times 100\% = \frac{n_c}{n} \times 100\% \quad (27)$$

Figure 6:
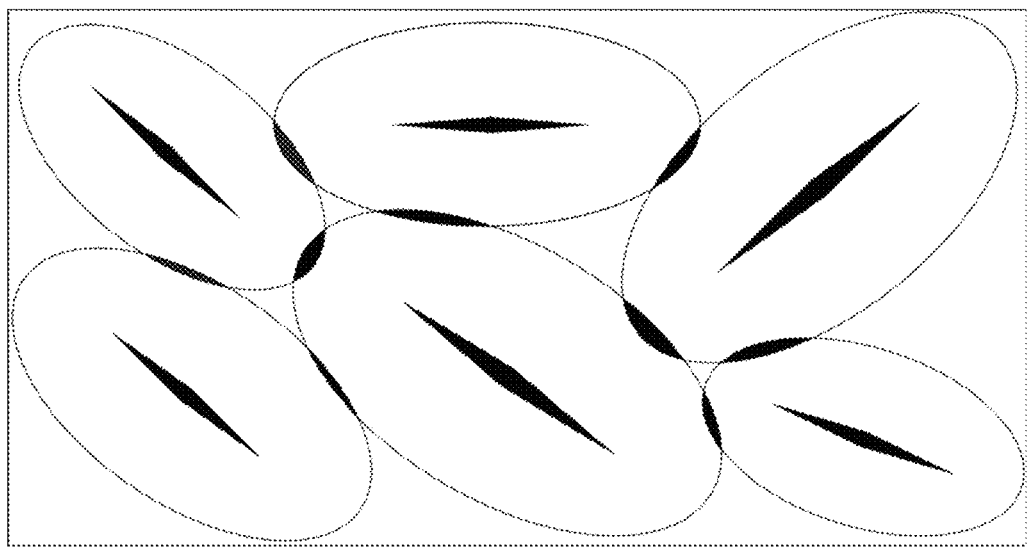
FIG. 6 is the arrangement with the interference ratio <10% after optimization by computer programs according to at least an embodiment of this disclosure.
Figure 7:
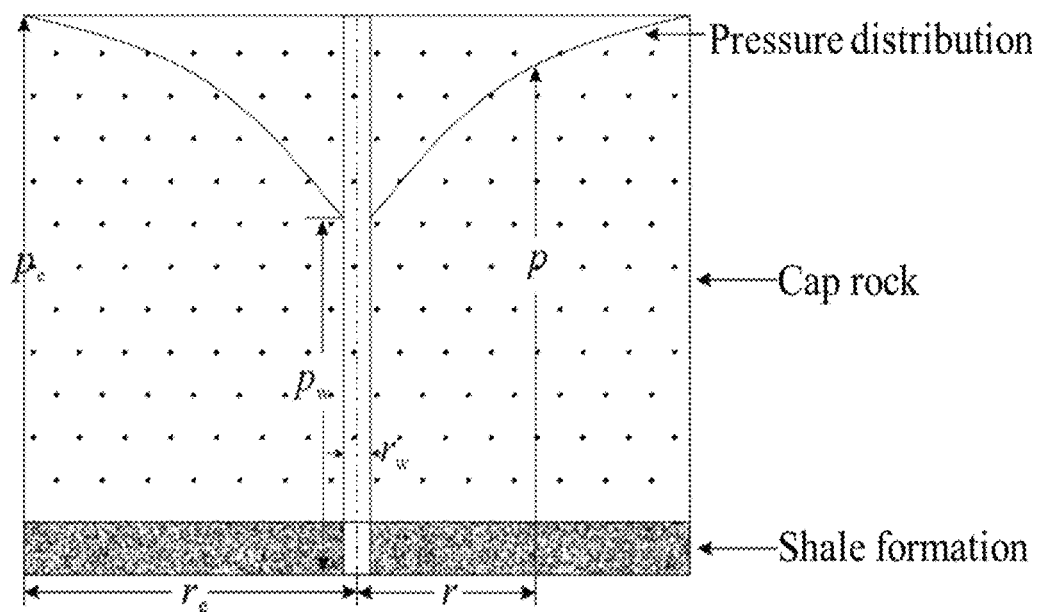
FIG. 7 is a schematic drawing of a shale gas reservoir and the pressure distribution in the reservoir according to at least an embodiment of this disclosure, wherein $p_e$, $p_w$, p represent the pressure at related positions, and $r_e$ is the radius of the supply boundary.

When the overlap of the recoverable ranges of any two horizontal wells is larger than 10%, as shown in FIG. 5, the interference is considered to be too large, and they should be re-arranged. The program would continue iterating and stop until the interference degree of any two wells is less than 10%, as shown in FIG. 6. The pattern after optimization can decrease interference considerably, which is of crucial meaning to the productivity optimization after the fracturing of shale gas horizontal wells. The final shale gas reservoir and the distribution of reservoir pressure are shown in FIG. 7.

Figure 8:
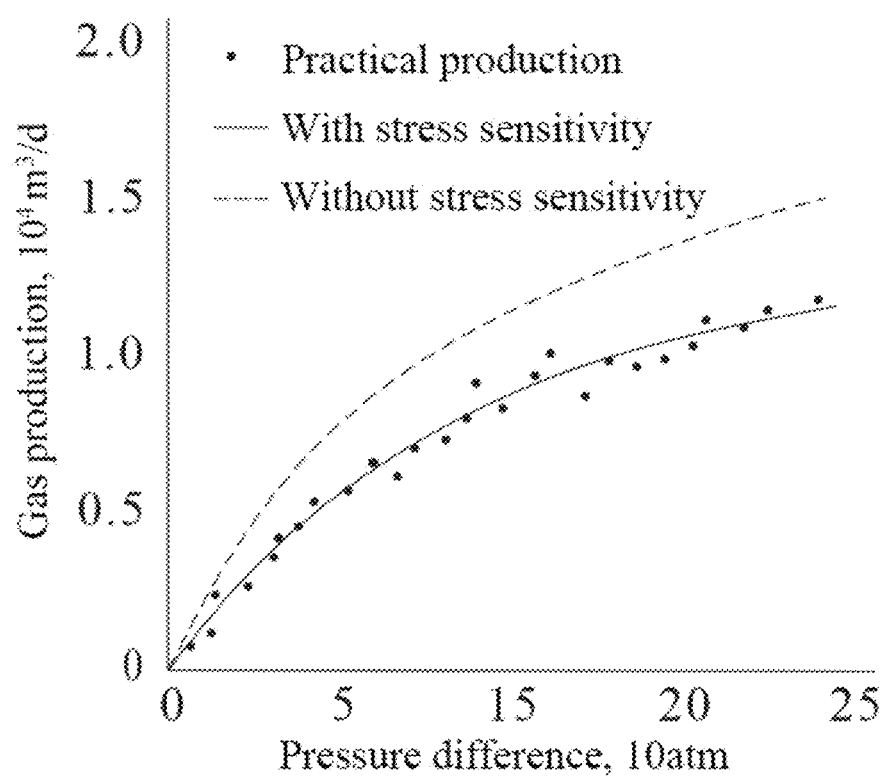
FIG. 8 is the comparison of the real output of shale gas with the respective calculated values according to at least an embodiment of this disclosure.

FIG. 8 shows the calculation of two models with and without the consideration of the influences of stress to porosity and permeability. Meanwhile, it shows the real gas production changing with production pressure difference. By comparison, it is readily to notice that the corrected model, i.e. the one considering the influences of stress, fits more closely to the real production situation and describes or predicts the real production more precisely. Consequently, the method of optimizing well spacing for shale gas development provided in this disclosure adopts more accurate models, which can optimize the exploring parameters, increase economic benefit, enhance production efficiency, and ensure production safety.

Above are the preferred embodiments of this disclosure. It should be pointed out that many modifications and variations of the present disclosure may be made by those skilled in the art without departing from the spirit of this disclosure. These modifications and variations should be considered to fall within the scope of the appended claims.

What is claimed is:

1. A method of optimizing well spacing for shale gas development, comprising:
    identifying the geological structure of a shale reservoir, verifying area of blocks based on explored geological structure,
    analyzing connection situation of the shale reservoir, selecting blocks with good connectivity as minimum developing area units,
    calculating recoverable reserves of each minimum developing area unit, selecting minimum developing area units satisfying an economic criterion as alternative options, or abandoning the minimum developing area units failing to satisfy the economic criterion,
    drilling representative shale cores in the minimum developing area units that are selected, performing experiments on the representative shale cores, and identifying related parameters via experiments,
    establishing mathematical models, and integrating the related parameters into the mathematical models for calculating seepage field and pressure field, and calculating effective recoverable boundary of each well based on the seepage field and pressure field, calculating effective recoverable area of each well based on the effective recoverable boundary of each well, and arranging wells according to the effective recoverable area of each well.

2. The method of optimizing well spacing for shale gas development as defined in claim 1, wherein verifying area of blocks comprises: drawing the outline of the blocks proportionally on grid paper, of which the grids are squares, verifying the number of grids, which is multiplied by the area of a single grid, and obtaining area of blocks.

3. The method of optimizing well spacing for shale gas development as defined in claim 1, wherein the recoverable reserve V of each minimum developing area unit is $$V = Ah\phi(1-S_{wc})$$

wherein A is the area of a recoverable block, h is reservoir thickness, $\phi$ is stress-affected rock porosity, expressing the percentage of pores in the apparent volume of rock, and $S_{wc}$ is the saturation of bound water.

4. The method of optimizing well spacing for shale gas development as defined claim 1, wherein the economic criterion is $$\frac{(\text{Economic value of recoverable reserve} - \text{Developing cost})}{\text{Developing cost}} \times 100\% \geq 10\%.$$

5. The method of optimizing well spacing for shale gas development as defined in claim 1, wherein the related parameters include permeability, rock porosity, shale desorption curves, gas viscosity, gas density, and pore compressibility.

6. The method of optimizing well spacing for shale gas development as defined in claim 5, wherein the mathematical models compromise: stress-affected rock porosity $$\phi = \phi_0 e^{-\alpha C_\phi \sigma}$$

wherein $\phi$ is stress-affected rock porosity; $\phi_0$ is rock porosity without being affected by stress; $C_\phi$ is pore compressibility, expressing the variation in porosity with a unit decrease in formation pressure; σ is effective stress, atm; α is correction coefficient, α>0,
the expression of stress-sensitive permeability $$K = K_0 e^{-\beta C_\phi \sigma}$$

wherein K is stress-affected permeability of porous media, μm²; $K_0$ is permeability without being affected by stress, μm²; β is correction coefficient, β>0,
the stress-affected seepage velocity of shale gas v $$v = -\frac{K_0 e^{-\beta C_\phi \sigma}}{\mu}\left(1 + \frac{3\pi a \phi_0 e^{(\beta-\alpha)C_\phi \sigma}}{16K_0}\frac{\mu D_k}{p}\right)\left(\frac{dp}{dr}\right)$$

wherein α is sparse factor, $$a = \frac{128}{15\pi^2}\tan^{-1}(4K_n^{0.4});$$

$D_K$ is Knudsen diffusion coefficient, $$D_K = \frac{4\bar{r}}{3}\sqrt{\frac{2ZRT}{\pi M}};$$

$K_n$ is Knudsen Number; μ is gas viscosity, mPa·s; p is formation pressure, atm; $\bar{r}$ is flowing pore radius, m; Z is gas deviation factor; R is universal gas constant, J·mol⁻¹·K⁻¹; T is temperature, K; M is gas molecular mass; r is the distance of any spot in the reservoir away from a well, m.

7. The method of optimizing well spacing for shale gas development as defined in claim 6, wherein the mathematical models further compromise:
formation pressure distribution $$\left(p + \frac{3\pi a \phi_0 e^{(\beta-\alpha)C_\phi \sigma}\mu D_K}{16K_0}\right)^2 = \left(p_e + \frac{3\pi a \phi_0 e^{(\beta-\alpha)C_\phi \sigma}\mu D_K}{16K_0}\right)^2 - \frac{\left(p_e + \frac{3\pi a \phi_0 e^{(\beta-\alpha)C_\phi \sigma}\mu D_K}{16K_0}\right)^2 - \left(p_w + \frac{3\pi a \phi_0 e^{(\beta-\alpha)C_\phi \sigma}\mu D_K}{16K_0}\right)^2}{\ln\frac{R(t)}{r_w}}\ln\frac{R(t)}{r}$$

wherein the subscript e is original condition, w is wells; $p_e$ is the pressure at supply boundary, atm; $p_w$ is the pressure at the bottom of a well, atm; $R_{(t)}$ is the propagation distance of pressure at time t, m; $r_w$ is the radius of a gas well, m.

8. The method of optimizing well spacing for shale gas development as defined in claim 7, wherein the effective recoverable boundary is $$R(t) = \sqrt{\frac{t}{\frac{\phi_0 e^{(\beta-\alpha)C_\phi \sigma}\mu c}{2K_0} + \pi h\frac{q_d t}{q}}}$$

wherein t is production time, d; c is gas compressibility factor, atm⁻¹; $q_d$ is desorption of per unit volume of shale within per unit time, kg·m⁻³·d⁻¹; q is flow rate, kg/d; h is reservoir thickness.

9. The method of optimizing well spacing for shale gas development as defined in claim 8, wherein free gas from original condition till present condition of minimum developing area unit is $$Q_f = \int_{r_w}^{R(t)} 2\pi r h[(\phi\rho)_e - (\phi\rho)]dr$$

wherein ρ is gas density, kg/m³;
desorption gas $Q_d$ is $$Q_d = \int_{r_w}^{R(t)} 2\pi r h q_d t\, dr$$

gas recovered from formation $Q_1$ is $$Q_1 = Q_f + Q_d = \int_{r_w}^{R(t)} 2\pi r h\{[(\phi\rho)_e - (\phi\rho)] + q_d t\}dr$$

gas recovered from wells $Q_2$ is $$Q_2 = \pi r_w^2 h[(\phi\rho)_e - (\phi\rho)_w]$$

total gas output Q is $$Q = Q_1 + Q_2 = \pi h\frac{\phi_0 e^{-\alpha C_\phi \sigma}cT_{sc}Z_{sc}\rho_{gsc}}{p_{sc}TZ}\left[\left(p_e + \frac{3\pi a \phi_0 e^{(\beta-\alpha)C_\phi \sigma}\mu D_K}{16K_0}\right)^2 - \left(p_w + \frac{3\pi a \phi_0 e^{(\beta-\alpha)C_\phi \sigma}\mu D_K}{16K_0}\right)^2\right]\frac{R^2(t) - r_w^2}{2\ln\frac{R(t)}{r_w}} + \pi h q_d t[R^2(t) - r_w^2]$$

wherein the subscript sc is physical properties under standard state conditions, $p_{sc}$ is the pressure under standard state conditions (273.15K), atm; $Z_{sc}$ is the gas deviation factor under standard state conditions; $T_{sc}$ is the temperature under standard state conditions, K; $\rho_{gsc}$ is the gas density under standard state conditions, kg/m³;
flow rate at the producing well q is $$q = \frac{\pi K_0 e^{-\beta C_\phi \sigma} h Z_{sc} T_{sc}\rho_{gsc}}{p_{sc}T\mu Z\ln\frac{R(t)}{r_w}}\left[\left(p_e + \frac{3\pi a \phi_0 e^{(\beta-\alpha)C_\phi \sigma}\mu D_K}{16K_0}\right)^2 - \left(p_w + \frac{3\pi a \phi_0 e^{(\beta-\alpha)C_\phi \sigma}\mu D_K}{16K_0}\right)^2\right]$$

the expression of total gas output based on steady seepage is Q=qt, and omitting the effects of $r_w$, the effective recoverable boundary is $$R(t) = \sqrt{\frac{t}{\frac{\phi_0 e^{(\beta-\alpha)C_\phi \sigma}\mu c}{2K_0} + \pi h\frac{q_d t}{q}}}.$$

10. The method of optimizing well spacing for shale gas development as defined in claim 8, wherein a horizontal well of shale gas forms a vertical fracture surface with a reservoir thickness of h and an opening of $2x_f$ at surrounding formation, the shape of the seepage region around the fracture is approximate to an ellipse, the equation for calculating the recoverable boundary is $$R_{me}(t) = \sqrt{\frac{t}{\frac{\phi_0 e^{(\beta-\alpha)C_\phi \sigma}\mu c}{2K_0} + \pi h\frac{q_d t}{q}}}$$

-continued $$R_{fe}(t) = \sqrt{x_f^2 + \cfrac{t}{\cfrac{\phi_0 e^{(\beta-\alpha)C_\phi \sigma}\mu c}{2K_0} + \pi h \cfrac{q_d t}{q}}}$$

wherein $x_f$ is the half-length of a fracture, m; $R_{me}(t)$ is the length of the minor axis of an ellipse, m; $R_{fe}(t)$ is the length of the major axis of an ellipse, m, and the area of effective recovery is: $S = \pi R_{me}(t) R_{fe}(t)$, wherein S is the area of an ellipse, m².

11. The method of optimizing well spacing for shale gas development as defined in claim 10, wherein during arranging the wells, interference ratio among wells I is calculated, wherein the interference ratio among wells I is the percentage of one of the two intersecting ellipses, and when calculated interference ratio among wells I related to each of the two intersecting ellipses is no more than 10%, the well arrangement succeeds.

12. The method of optimizing well spacing for shale gas development as defined in claim 11, wherein when the interference ratio among wells I is calculated, each ellipse is divided into a plurality of small grids, wherein area of each small grid is equal, and the number of grids within the overlap is calculated, which is further divided by the total number of grids within a single ellipse, and the specific equation is $$I = \frac{S_c}{S} \times 100\% = \frac{n_c}{n} \times 100\%$$

wherein $S_c$ is the area of overlap, m²; $n_c$ is the number of grids within the overlap among different ellipses; n is the number of grids within a single ellipse.

* * * * *